(Model.)

G. W. SMITH.
WAGON SKEIN.

No. 267,268. Patented Nov. 7, 1882.

WITNESSES:
Francis McArdle
C. Sedgwick

INVENTOR:
G. W. Smith
BY Munn & Co
ATTORNEYS.

UNITED STATES PATENT OFFICE.

GEORGE WASHINGTON SMITH, OF ROCK FALLS, ILLINOIS.

WAGON-SKEIN.

SPECIFICATION forming part of Letters Patent No. 267,268, dated November 7, 1882.

Application filed July 19, 1882. (Model.)

*To all whom it may concern:*

Be it known that I, GEORGE W. SMITH, of Rock Falls, in the county of Whiteside and State of Illinois, have invented a new and Improved Thimble-Skein and Axle-Box, of which the following is a full, clear, and exact description.

The object of the invention is to improve thimble-skeins and journal-boxes, as hereinafter described.

Reference is to be had to the accompanying drawings, forming part of this specification, in which similar letters of reference indicate corresponding parts in all the figures.

Figure 1:
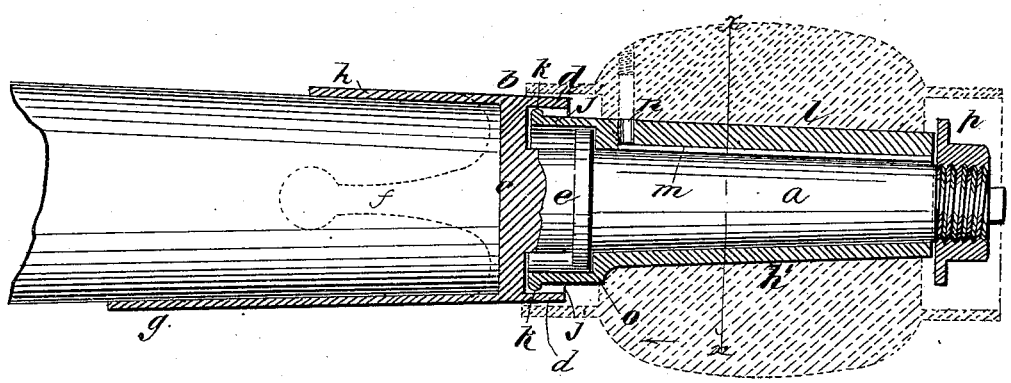
Figure 2:
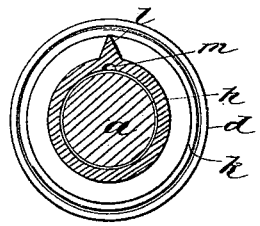
Figure 3:
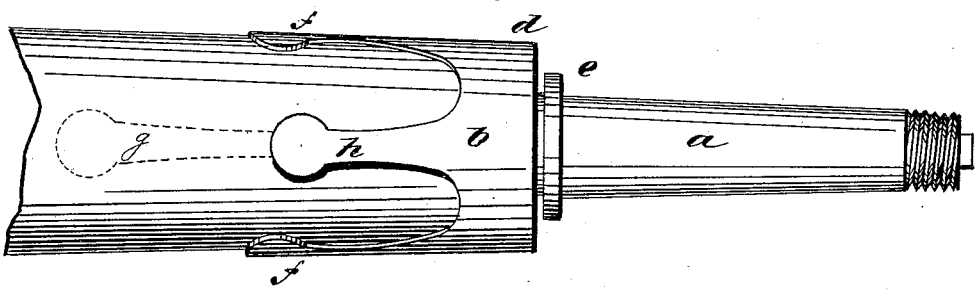

Figure 1 is a longitudinal sectional elevation of the socket and head of my improved thimble-skein, also a section of the box and a side elevation of a portion of the axle. Fig. 2 is a transverse section of Fig. 1, taken on line $xx$ thereof; and Fig. 3 is a side elevation of the thimble-skein and part of the axle.

I make a malleable-iron thimble-skein, $a$, with a socket, $b$, head $c$, sand-band $d$, collar $e$, side arms, $f$, bottom arm, $g$, and top arm, $h$, all cast together in one piece, locating the collar $e$ a little farther than the length of sand-band $d$ from head $c$, and making the socket shallow, and using the arms for making a secure fastening to the axle rather than the deep socket commonly employed, whereby the moisture will dry out of the wood better after getting wet, and the dry-rot to which the axle ends fitted in deep sockets are subject will be prevented. The arm $g$ is made in suitable length for reaching to the hound for being secured by the same bolt that secures the hound. The side arms, $f$, terminate at the points where the hound-braces connect, so as to be secured by the same bolt that fastens them, and the upper arm, $h$, is to be fastened by a long screw. The sand-band $d$ projects sufficiently beyond the head $c$ to overlap the inner end of the box $h'$, for preventing the sand and dust from working into the bearing, and said box also has a sand-band, $j$, extending beyond its shoulder $o$ for the collar $e$, into band $d$, and up to head $c$, for the same purpose, and also for strengthening it for wedging more firmly into the hub of the wheel, and at the upper end it has a bead or collar, $k$, to make a tight joint for protection from dust. Under the flange $l$, which I make large and strong for a substantial fastening in the hub, I make a groove, $m$, to hold oil for lubrication, which is to be poured in through a hole in the hub and box at $n$, to be fastened by a cork or other suitable plug that will allow of being pressed in, and will hold by compression; or a screw-plug may be employed. By this means the axle may be lubricated without taking the wheel off.

The nut $p$ is intended to press the shoulder $o$ of the box and make the joints tight at both ends of the box, to prevent the waste of oil.

The sand-band $j$ on the box prevents the oil from working onto the end of the hub, and thus protects the wedges by which the box is secured and the spokes from being softened by the oil, which is a common difficulty and causes them to work loose.

I am aware that it is not new to fit a bushing in an axle-box so that it may be removed and replaced at pleasure by removing the axle-nut, or to make an axle-skein open from its inner shoulder, with a flange overlapping the inner end of box and provided with a tapering arm, or to arrange an oil-groove under an axle-box flange, and so connect it with a hole in box and hub that vehicle-wheels may be oiled without being removed, or to apply a metallic arm to the extremity of a wooden axle, so as to utilize a mixture of wood and metal; but What I do claim as new and of my invention is—

1. A thimble-skein having socket $b$, head $c$, sand-band $d$, collar $e$, side arms, $f$, bottom arm, $g$, and top arm, $h$, all constructed and arranged to adapt it to be used in connection with a wooden axle, as described.

2. The combination, with a skein having head $c$, collar $e$, and sand-band $d$, of the box $h'$, having the sand-band $j$, shoulder $o$, and collar $k$, as and for the purpose specified.

GEORGE WASHINGTON SMITH.

Witnesses:
V. S. FERGUSON,
C. N. MUNSON.